Aug. 29, 1939.   E. G. CARROLL   2,170.851
MASTER CYLINDER AND PISTON STRUCTURE
Original Filed April 28, 1932    2 Sheets-Sheet 1
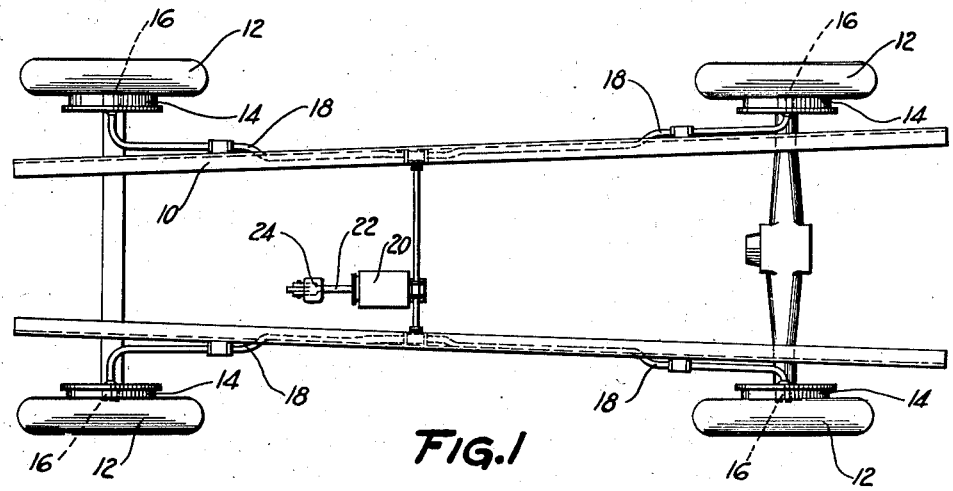
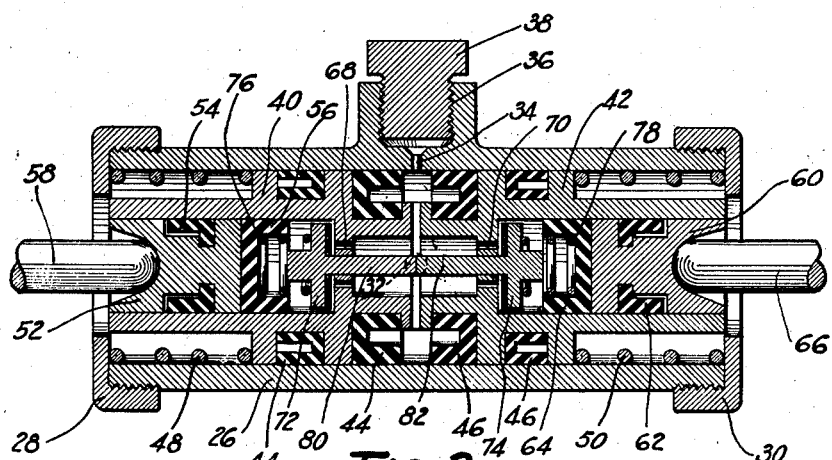
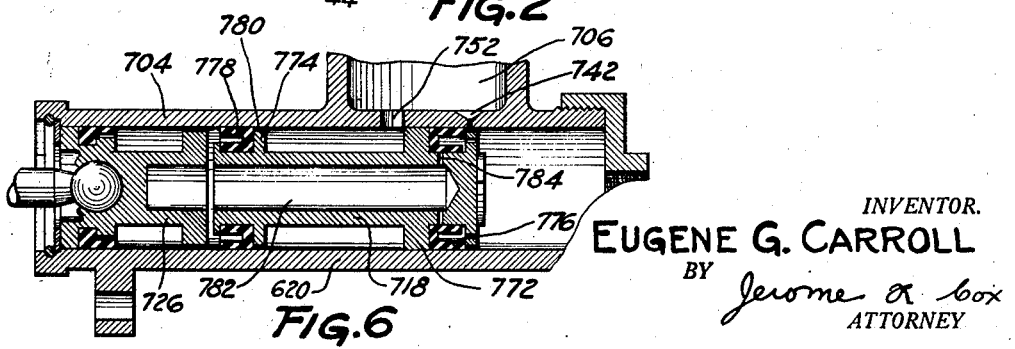
INVENTOR.
EUGENE G. CARROLL
BY Jerome K. Cox
ATTORNEY

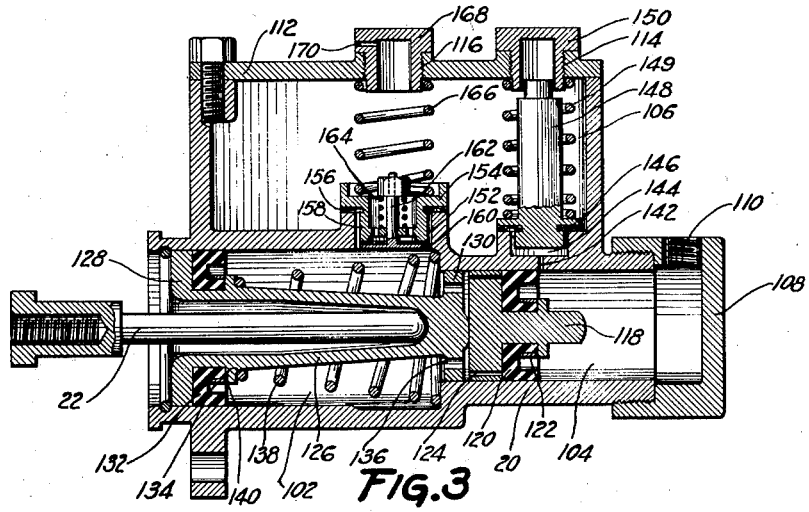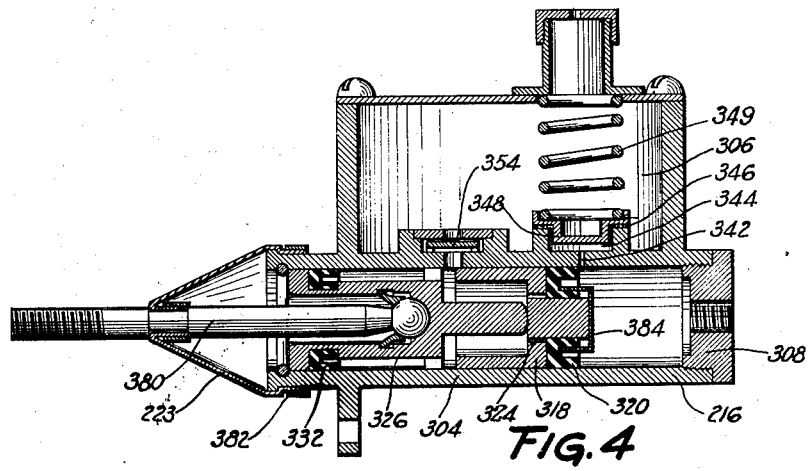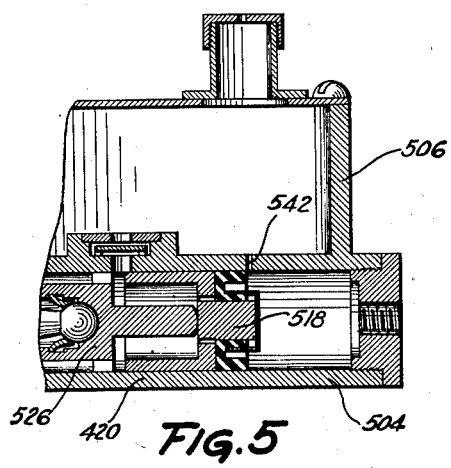

Patented Aug. 29, 1939

2,170,851

UNITED STATES PATENT OFFICE 2,170,851

MASTER CYLINDER AND PISTON STRUCTURE

Eugene G. Carroll, Los Angeles, Calif., assignor to Bendix Aviation Corporation, South Bend, Ind., a corporation of Delaware Application April 28, 1932, Serial No. 608,116
Renewed December 9, 1937

3 Claims. (Cl. 60—54.6)

This invention relates to brakes and more particularly to hydraulic braking systems.

One of the difficulties met with in hydraulic braking systems is that of preventing the drawing of air into the system during the braking operations. When air is allowed to enter the system it fills spaces which should be filled with liquid and upon application of the brakes, the air is compressed and gives a springy and unsatisfactory operation. An analagous difficulty encountered in the design of hydraulic brake systems is the provision of means for forcing air from the system whenever any amount thereof by any chance enters in, and in the provision of means for forcing air from the system initially.

Another difficulty encountered in braking systems of all kinds, is the limitation of leverages obtainable. Leverages are limited by two factors. First they are limited by the fact that the brake shoes must be moved at least a certain distance determined by the minimum clearance allowable to prevent dragging of the brakes and the additional clearance developed through wear of the brakes. Second, the leverages are limited by the limitation of movement of the pedal on account of the space available within the vehicle and the comfort of the driver.

One of the objects of this invention is to provide satisfactory means for bleeding a hydraulic brake system and for compensating the system for changes in volume of fluid whether due to temperature changes, or to wastage of the liquid through any means whatsoever.

A further object of the invention is to increase the maximum leverages possible while retaining adequate movement of the shoes.

A feature of the invention is the provision of an improved form of two phase wheel cylinder, having the transfer from one phase to the other responsive to pressure developed in the system; this feature, however, is claimed in my divisional application No. 234,565, filed October 12, 1938.

Further objects and features of the invention will be apparent after a reading of the subjoined specification and claims and after a consideration of the accompanying drawings, in which:

Figure 1 is a more or less diagrammatic view in plan of a chassis of an automobile equipped with a hydraulic brake system;

Figure 2 is a view in vertical section and on an enlarged scale of one of the wheel cylinders shown in Figure 1;

Figure 3 is a view in vertical section on an enlarged scale showing the master cylinder of Figure 1;

Figure 4 is a view in vertical section and on an enlarged scale of a modified form of master cylinder;

Figure 5 is a view in vertical section and on an enlarged scale of a fragment of a modified form of master cylinder; and Figure 6 is a view in section of a fragment of a modified form of master cylinder.

In Figure 1, I have shown an automobile chassis having a frame 10, supported on wheels 12. Each of the wheels 12 is provided with brakes 14 adapted to be moved into contact with the cooperating drums by wheel cylinders 16. A liquid is supplied to the wheel cylinders 16 through conduits 18 connected to a master cylinder 20. The master cylinder 20 is adapted to be operated through a piston rod 22 by a pedal 24.

Each of the wheel cylinders 16 comprises a cylindrical casting 26 provided at its ends with caps 28 and 30 which are securely screwed onto the ends of the casting. The cylinder is formed with an inlet opening 32 connected with its associated conduit 18 and with an outlet opening 34 leading to a tapped recess 36 normally closed by a plug 38.

Positioned within the cylinders are a pair of annular pistons 40 and 42 provided with annular rubber cups 44 and 46 respectively. Interposed between the annular piston 40 and the cap 28 is a spring 48 and interposed between the piston 42 and the cap 30 is a spring 50, these springs serving to maintain the pistons normally in their innermost positions. Within the annular piston 40 there is slidably mounted a central piston 52 provided with a cup packing 54 for preventing the ingress of fluid past the piston and provided with a cup packing 56 for preventing the exit of fluid past the piston.

A piston rod 58 transmits motion from the piston 52 to the brake shoe. On the opposite side of the cylinder there is provided a similar central piston 60 provided with cup packings 62 and 64 and having associated therewith a piston rod 66. Central openings through the inner ends of the pistons 40 and 42 are partially closed but are provided with openings such as 68 and 70. These openings are at times closed by check valves 72 and 74, the valves being urged toward their seats by springs 76 and 78 and being provided with stems 80 and 82 which contact with each other and normally prevent the valves from resting upon their seats.

When fluid is supplied to the cylinder 16 through the inlet 32, it passes through the openings 68 and 70 and acting against the pistons 52 and 60 forces the rods 58 and 66 outward thus moving the brake shoes into contact with the brake drums. The forces of the springs 48 and 50 hold the pistons 40 and 42 in their normal inward position. However, as soon as sufficient resistance to movement of the brake shoes and the pistons 52 and 60 is developed, pressure in the fluid rises sufficiently to overcome the springs 48 and 50 and the fluid acts to move the large pistons 40 and 42. As soon as the pistons 40 and 42 begin to move, the springs 76 and 78 close the valves 72 and 74 and the liquid trapped between said valves and their corresponding pistons 52 and 60 forms a substantially solid link between the annular pistons and their corresponding central pistons. Thereupon fluid pressure acts upon the large pistons to apply the shoes to the drums at much higher pressures.

When pressure on the fluid is released by the release of the pedal 24, the large pistons 40 and 42 return first to their normal position thus causing the stems 80 and 82 to contact and to move the valves 72 and 74 from their seats whereupon liquid trapped behind the valves is allowed to escape and the pistons 52 and 60 are allowed to return to their normal positions shown.

In Figure 3, I have shown a master cylinder 20 formed with a relatively large substantially cylindrical portion 102, a smaller concentric substantially cylindrical portion 104 and an annular flange 106 designed to form a reservoir for the cylinder. The front end of the cylinder is closed by a cap 108 formed with an outlet opening 110 connected with the conduits 18. The upper part of the reservoir 106 is closed by a cap 112 provided with tapped openings 114 and 116 for purposes later to be more fully described. Positioned in the cylindrical portion 104 is a floating piston 118 provided with an annular cup packing 120 held in place by a spring clip 122 and formed with grooves such as 124.

Rearward of the floating piston 118 is a skeleton piston 126 provided with a rear head 128 substantially fitting the portion 102 and with a forward head 130 substantially fitting the portion 104. The head 128 is provided with an annular cup 132 held in place by a spring clip 134 and the head 130 is formed with a plurality of openings such as 136. A spring 138 bears against a shoulder 140 on the piston 126 and normally urges the piston toward its rearward position shown. The front end of the piston 126 normally contacts with the rear end of the floating piston 118.

Just in advance of the normal position of the floating piston 118 the cylinder is formed with a relatively small port 142 leading into a recess 144 having its upper end closed by a washer 146 and a plunger 148 which normally maintains the washer firmly against its seat. The plunger 148 is guided at its lower end by a projection thereon which extends into the recess 144 and at its upper end by another projection thereon which extends into a recess formed in a plug 150 screwed into the tapped bore 114.

Adjacent the forward end of the portion 102 the cylinder is formed with a relatively large opening 152 normally closed by a two-way valve 154. This valve comprises a washer 156, a guide 158 normally maintaining the washer upon its seat, a valve 160 having a stem 162 extending upward through the guide 158, and a spring 164 normally maintaining the valve 160 upon its seat. The guide 158 is normally urged downward by a spring 166 held in place at its upper end by a lower projection of a plug 168 screwed into the tapped bore 116 and provided with a vent opening 170.

In the operation of the above described hydraulic brake system, liquid is introduced into the reservoir formed by the flange 106 and passes through the valve 154 into the portion 102 of the cylinder 20. Reciprocation of the pedal 24 operates through the piston rod 22 to reciprocate the piston 126 which causes a forward movement of the floating piston 118 and thus forces fluid through the outlet 110 and the conduits 18, to the wheel cylinders. The plug 38 having been removed air is forced out through the recess 36.

On the return stroke of the piston 126, the piston 118 may not return from its forward position so that no air is drawn in at any point of the system. Liquid, however, is drawn down through the valve 154 into the portion 102 filling that portion of the cylinder 20. On the forward stroke of the skeleton piston 126 the liquid trapped in the portion 102 is forced forward through the groove 124 past the cup 120 into the conduit 18 and the cylinder 16. The process continues until the conduit and the cylinders are completely filled and until the shoes are partially extended. Thereafter, upon the return stroke, the return springs of the brake and possibly the springs 48 and 50 force the fluid back and thus force the floating piston 118 back to the position shown.

Throughout the operation thereafter the skeleton piston 126 operates to force a small quantity of additional liquid forward into the system ahead of the floating piston 118. However, on each return stroke, any excessive quantity of liquid is relieved through the port 142, past the washer 146, the amount of pressure maintained in the system being determined by the strength of the spring 149. Similarly, any excessive pressure in the portion 102 may be relieved past the washer 156. Liquid forced forward through the conduits 18, to the cylinders 16 operates in a manner previously described to spread the shoes by means of the pistons 52 and 60 at a relatively low leverage from the pedal to the brakes and with consequent relatively large travel of the pistons 52 and 60. However, as soon as any substantial resistance is encountered, the liquid acts upon the large pistons 40 and 42 at relatively high leverages but with relatively low piston travel.

In Figure 4, I have shown a cylinder 216 having a cylindrical portion 304 which has a substantially uniform diameter throughout. The portion 304 has a front cap 308 and an annular flange or reservoir 306. The cylinder is provided with a floating piston 318 and a skeleton piston 326. It is operated by a piston rod 380 and is provided with an annular cup 332. A rubber boot 223 is provided to keep out dirt and is held in place by a spring band 382. Immediately in advance of the cup 320 is a port 342 leading to a recess 344 formed by an annular flange on the cylindrical portion 304 within the reservoir 306. The top of the recess 344 is sealed by washer 346 and a guide 348 therefor, the guide being normally urged to contact with the washer by a spring 349. The annular cup 320 is maintained in position by a spring cap 384. The valve 354 is a simple one-way valve allowing liquid to pass freely from the reservoir 306 and into the cylinder 304 but preventing the passage of liquid outward. Excessive pressures in the rear part of the cylinder are relieved through grooves 324 past the cup 320 and through the port 342 and past the valve formed by a washer 346.

In the modification shown in Figure 5, the cylinder 420 is formed with a cylindrical portion 504 and a reservoir portion 506 and is provided with a floating piston 518 and a skeleton piston 526. The reservoir is connected to the forward part of the cylinder by a port 542, but no valve is provided for this port, the system being adapted to be maintained under atmospheric pressure.

In the modification shown in Figure 6, the cylinder 620 is formed with a cylindrical portion 704 and a reservoir portion 706 and is provided with a floating piston 718 and a skeleton piston 726. The reservoir is connected to the forward part of the cylinder by a port 742 and rearwardly thereof by a relatively large opening 752 but no valves are provided for these ports, the system being adapted to be maintained under atmospheric pressure.

The floating piston 718 is formed with a forward head 772 and a rearward head 774. Associated with the forward head 772 is an annular rubber cup packing 776 facing forward and associated with the rearward head 774 is a similar packing 778 facing rearward. The head 774 is formed with a plurality of grooves or ports such as 780. The piston 718 is formed with a relatively large central recess 782 which extends forward to a point in advance of the head 772 where one or more ports 784 lead through the walls of said piston from said recess to the cup 776.

In the operation of this form of cylinder, movement forward of the piston 726 forces the piston 718 forward and forces liquid trapped in front of the head 772 to the brakes. The return of the piston 726 allows the return of the piston 718 provided the pressure at the brakes is sufficient. If the pressure at the brakes is insufficient to return the piston 718, the return of the piston 726 draws additional fluid from the reservoir 706 through the opening 752 and the ports 780 and past the cup valve 778. Then the next forward stroke forces liquid through the recess 782 and the port 784 and past the cup valve 776 thus supplying adequate liquid ahead of said piston 772. Thus the system may be initially charged with liquid and any air trapped therein bled by being forced out through the wheel cylinder and also the system may be adequately compensated during operation for any losses which may occur. It may be seen that the piston 774 and the cup 778 serve as means associated with the rearward opening 752 allowing substantially free passage of liquid through said opening from the reservoir to the master cylinder but normally restraining passage of liquid in a reverse direction.

It is to be understood that the above described embodiments of my invention are for the purpose of illustration only and various changes may be made therein without departing from the spirit and scope of the invention.

I claim:

1. In a hydraulic brake system, a fluid pressure producing device comprising a casing provided with a pair of openings, a reservoir associated therewith having its interior open to the atmosphere and communicating with said casing through both of said openings, a piston in said casing normally positioned rearwardly of the forward one of said openings, a check valve for the rearward opening allowing passage of liquid therethrough from said reservoir to said casing but normally preventing such passage in the reverse direction, a valve associated with said forward opening, and a spring bearing on said last named valve and maintaining it closed until the hydraulic pressure in said casing increases above a predetermined amount.

2. In a hydraulic brake system, a master cylinder provided with a pair of openings, a reservoir associated therewith having its interior open to the atmosphere and communicating with said cylinder through both of said openings, a piston in said master cylinder normally positioned rearwardly of the forward one of said openings, a check valve for the rearward opening allowing passage of liquid therethrough from said reservoir to said master cylinder but normally preventing such passage in the reverse direction, another valve associated with said check valve and opening toward the reservoir, and resilient means for normally holding said last named valve upon its seat until pressure in said cylinder increases above a predetermined amount.

3. In a hydraulic brake system, a master cylinder provided with a pair of openings, a reservoir associated therewith having its interior open to the atmosphere and communicating with said cylinder through both of said openings, a piston in said master cylinder normally positioned rearwardly of the forward one of said openings, a check valve for the rearward opening allowing passage of liquid therethrough from said reservoir to said master cylinder but normally preventing such passage in the reverse direction, another valve associated with said check valve and opening toward the reservoir, resilient means for normally holding said last named valve upon its seat until pressure in said cylinder increases above a predetermined amount, a valve associated with said forward opening, an upwardly extending guide for said last named valve, a guide plug threaded into said reservoir and restraining the movement of said guide, and a spring seated at one end upon said guide plug and at the other end upon said valve.

EUGENE G. CARROLL.